United States Patent [19]
Williams

[11] 4,066,314
[45] Jan. 3, 1978

[54] ELECTRICAL CONNECTOR BACKSHELL ACCESSORY INDEXING BODY

[76] Inventor: Robert A. Williams, 55 Bounty Road East, Fort Worth, Tex. 76116

[21] Appl. No.: 700,392

[22] Filed: June 28, 1976

[51] Int. Cl.² ............................................. H01R 13/54
[52] U.S. Cl. .................................... 339/89 R; 285/354
[58] Field of Search .................................. 339/89–91; 285/354, 386, 387, 388

[56] References Cited
U.S. PATENT DOCUMENTS
1,977,106  10/1934  Wylie ................................. 339/89 R
FOREIGN PATENT DOCUMENTS
1,024,339  3/1966  United Kingdom .............. 339/89 C Primary Examiner—Roy Lake
Assistant Examiner—E. F. Desmond
Attorney, Agent, or Firm—Wofford, Felsman, Fails & Zobal

[57] ABSTRACT

An electrical connector backshell accessory body adapted to be confined within a coupling nut of the type having threads formed on its inside at one end and an inward extending shoulder spaced from the threads and located between the threads and the other end of the nut. The accessory body has a threaded shoulder adapted to be threaded into and beyond the nut threads to locate the threaded shoulder between the nut threads and the nut shoulder to confine the accessory body within the coupling nut but to allow the coupling nut and the accessory body to rotate relative to each other.

5 Claims, 9 Drawing Figures

ELECTRICAL CONNECTOR BACKSHELL ACCESSORY INDEXING BODY

BACKGROUND OF THE INVENTION

In the aircraft industry, accessory backshell adapters are required to immobilize wire bundles with regard to an electrical connector. These accessories provide means of clamping the wire bundles, extending from the connector, axially 45°, or 90° with respect to the connector axis. The connectors have projecting teeth on their back edge which engage teeth in the accessory indexing body when the coupling nut of the accessory backshell is threaded onto the connector.

Heretofore, the indexing body has been confined within the coupling nut by a variety of means such as snap rings, wire and groove, and upset forming, all of which have draw backs either in difficulty in manufacture or reliability in use. For example, snap ring arrangements have a history of allowing the accessory body to pop out due to the pressure caused by tightening the coupling nut and external force on the accessory body. Considerable manufacturing cost and in addition loss of parts is involved in the wire and groove method of confining the body within the coupling nut due to improper lubrication when forcing the wire in place, galling of metal, tolerances, etc. The upset method requires the parts to be very sturdy and heavy and the finished product is deformed and unsightly. The heaviness also causes an indesireable weight factor.

SUMMARY OF THE INVENTION

It is an object of the present invention to provide an electrical connector backshell accessory body which may be readily and economically produced and which may be reliably confined within a coupling nut.

The coupling nut is of the type having threads formed on its inside at one end and an inward extending shoulder spaced from the threads and located between the threads and the other end of the nut. The accessory body has a threaded shoulder adapted to be threaded into and beyond the nut threads to locate the threaded shoulder between the nut threads and the nut shoulder to confine the accessory body within the coupling nut but to allow the coupling nut and the accessory body to rotate relative to each other.

DETAILED DESCRIPTION OF THE INVENTION

Figure 1:
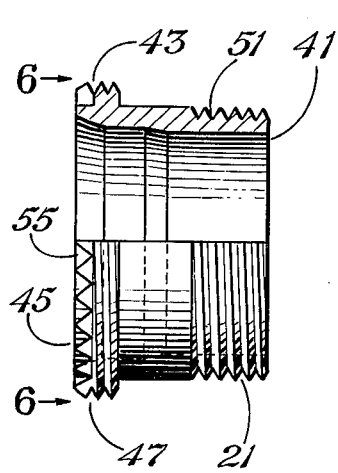
FIG. 1 is a partial cross-sectional side view of the accessory body of the present invention.
Figure 2:
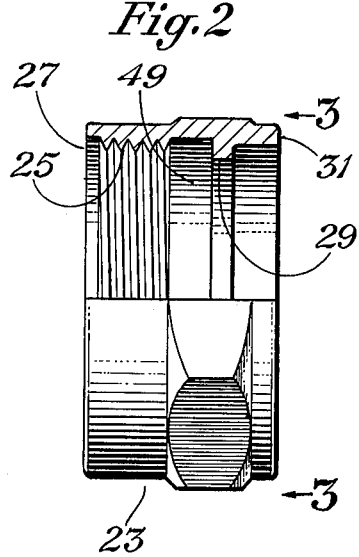
FIG. 2 is a partial cross-sectional side view of a coupling nut.
Figure 3:
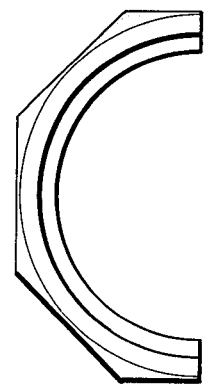
FIG. 3 is a view of FIG. 2 taken along the lines 3—3 thereof showing only one half of the coupling nut.
Figure 4:
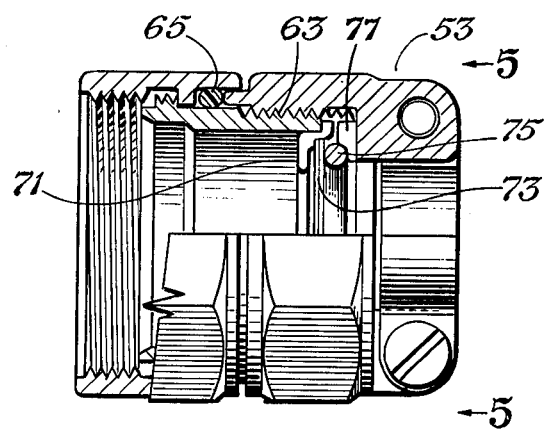
FIG. 4 is a partial cross-sectional side view of the accessory body and coupling nut coupled to an axial backshell accessory member.
Figure 8:
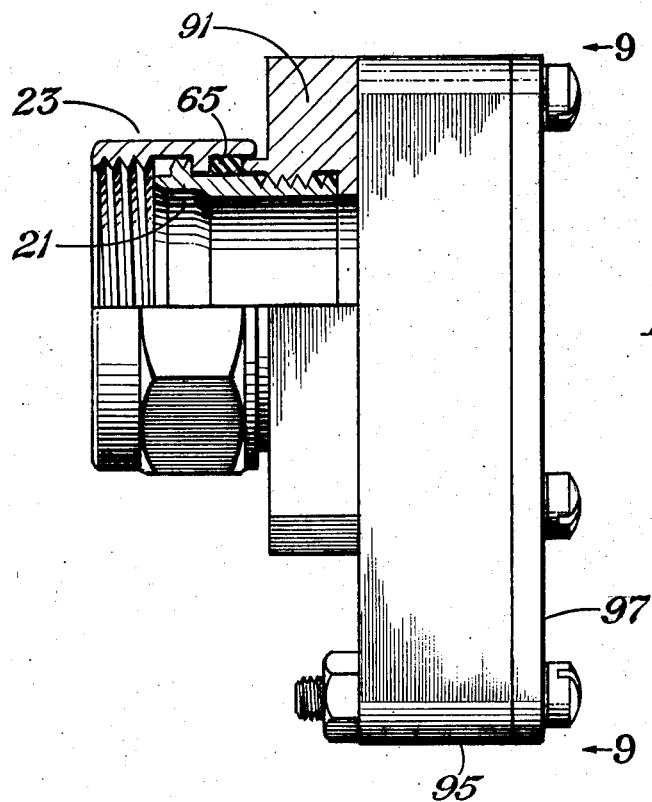
FIG. 8 is a partial cross-sectional side view of the accessory body and coupling nut coupled to a 90° backshell accessory member.

Referring now to the drawings, the accessory body of the present invention is identified by reference numeral 21. It is adapted to be confined in a coupling nut 23 as shown in FIGS. 4 and 8. The coupling nut 23 is of the type having threads 25 formed on its inside at one end 27 and an inward extending shoulder 29 spaced from the threads and located between the threads and the other end 31. The accessory body is a hollow cylindrical member having a first end 41 with an outside diameter sufficient to allow it to freely pass through the coupling nut and an outward extending shoulder 43 located at its other end 45 and having an outside diameter greater than the inside diameter of the inward extending shoulder 29 of the coupling nut. Threads 47 are formed on the outside of the outward extending shoulder 43 to allow the outward extending shoulder to be threaded into and beyond the threads 25 of the coupling nut to locate the shoulder 43 in the space 49 between the threads 25 and the shoulder 29 with the first end 41 of the accessory body extending beyond the end 31 of the coupling nut as shown in FIGS. 4 and 8. The space 49 formed between the threads 25 and the shoulder 29 is sufficient to allow the accessory body 21 and the coupling nut 23 to move a short distance axially with respect to each other. The outside diameter of the shoulder 43 is slightly less than the inside diameter of the nut in the space 49 such that the nut and the accessory body are free to rotate relative to each other when the shoulder 43 is confined to the space 49 of the coupling nut.

Figure 7:
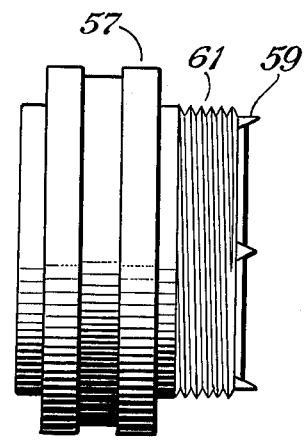
FIG. 7 is a side view of an electrical connector which may be threaded into the coupling nut of FIG. 4 to engage its teeth with the teeth formed on the end of the accessory body.

Threads 51 are formed on the outside of the end 41 of the accessory body whereby they may be threaded into a backshell accessory member such as that shown at 53. In addition, teeth 55 are formed on the end 45 of the accessory body for engaging the teeth of an electrical connector when it is threaded into the threads 25 of the coupling nut. FIG. 7 illustrates an electrical connector 57 having teeth 59 for engaging the teeth 55 of the accessory body. The connector 57 also has threads 61 formed on its end.

In assembling the accessory body 21 to the coupling nut 23 the end 41 is inserted into the coupling nut from the end 27 until the threads 43 engage the threads 25 of the coupling nut. The shoulder 43 then is threaded into the threads 25 and beyond to locate the shoulder 43 in the space 49 as shown in FIGS. 4 and 8. In this position, the threads 25 and the shoulder 29 confine the shoulder 43 within the space 49 and hence confine the accessory body within the coupling nut but still allow slight relative axial movement between the accessory body and the coupling nut and also allow rotational movement between the accessory body and the coupling nut. The threads 25 confine the shoulder 43 when it is in the space 49 in the sense that they prevent the shoulder 43 from moving pass the threads 25 (to the left as shown in FIGS. 4 and 8) by translational movement. Member 65 is a resilient O-ring which provides a self locking feature and a moisture barrier. The threads 51 of the accessory body then may be threaded into an accessory backshell member 53 as shown in FIG. 4. This member has threads 63 formed on its inside adapted to be threaded to threads 51 of the accessory body. The connector 57 may then be threaded into the threads 25 of the coupling member until the teeth 59 engage the teeth 55 of the accessory body to secure the connector in a rigid position relative to the accessory body and the coupling nut. Threading of the connector 57 into the coupling nut is carried out by rotating the coupling nut 23 to pull the connector inward.

Figure 5:
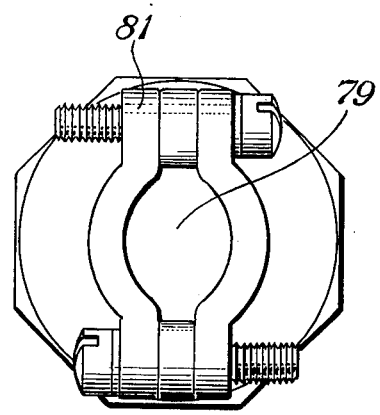
FIG. 5 is a view of FIG. 4 taken along the lines 5—5 thereof.
Figure 6:
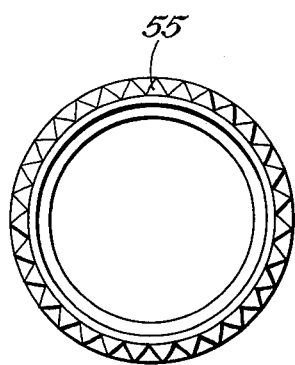
FIG. 6 is a view of the accessory body of FIG. 1 taken along the lines 6—6 thereof.

In FIGS. 4 and 5, the accessory backshell member 53 has located therein a EMI shield termination means including a split-ring 71, a multifinger ring 73, a ferrule 75, and a back ring 77. The electrical leads will extend through an opening 79 and be clamped in place by a clamping arrangement 81.

Figure 9:
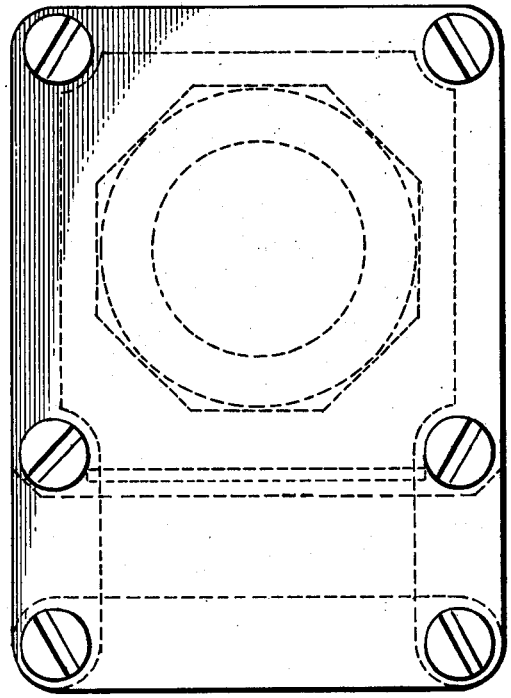
FIG. 9 is a view of FIG. 8 taken along the lines 9—9 thereof.

Referring to FIGS. 8 and 9, reference numeral 91 identifies a 90° backshell accessory member. In this device the electrical leads will extend from the end 95 and be clamped in place by a clamping arrangement illustrated at 97.

The coupling nut 23 within which the accessory body 21 is to be confined is octagonal rather than hexagonal since it requires less space which is of particular importance for threading purposes in tight or close places.

I claim:

1. An electrical connector backshell accessory body adapted to be rotatably confined within a coupling nut of the type having threads formed on its inside at one end and an inward extending shoulder spaced from said threads and located between said threads and the other end of said nut, said accessory body comprising:

a hollow cylindrical member having a first end with an outside diameter sufficient to allow it to freely pass through said coupling nut and an outward extending shoulder located at its other end and having an outside diameter greater than the inside diameter of said inward extending shoulder of said coupling nut, threads formed on the outside of said outward extending shoulder of said hollow cylindrical member to allow said outward extending shoulder to be threaded into and beyond said threads formed on the inside of said nut to locate said outward extending shoulder between said threads and said inward extending shoulder of said nut with said first end of said hollow cylindrical member extending beyond said other end of said nut, said threads and inward extending shoulder of said nut confining said outward extending shoulder of said hollow cylindrical member when located therebetween but allowing said nut and said hollow cylindrical member to move slightly axially with respect to each other, the outside diameter of said outward extending shoulder of said hollow cylindrical member being slightly less than the inside diameter of said nut between its threads and its inward extending shoulder whereby said nut and said hollow cylindrical member are free to rotate relative to each other when said outward extending shoulder of said hollow cylindrical member is located between said threads and said inward extending shoulder of said nut, threads formed on the outside of said first end of said hollow cylindrical member to allow said first end to be threaded into a backshell accessory member when said first end of said hollow cylindrical member extends beyond said other end of said nut, teeth formed on said other end of said hollow cylindrical member for engaging the teeth of an electrical connector when it is threaded into the threads of said nut and a self-locking O-ring located between the outside wall of said accessory body and the inside wall of said coupling nut when said accessory body is confined by said coupling nut, said self-locking O-ring being located between said inward extending shoulder and said other end of said coupling nut.

2. An electrical connector backshell accessory body adapted to be rotatably confined with a coupling nut of the type having threads formed on its inside at one end and an inward extending shoulder spaced from said threads and located between said threads and the other end of said nut, said accessory body comprising:

a single piece hollow cylindrical member having a first end with an outside diameter sufficient to allow it to freely pass through said coupling nut and an outward extending shoulder located at its other end and having an outside diameter greater than the inside diameter of said inward extending shoulder of said coupling nut, threads formed on the outside of said outward extending shoulder of said hollow cylindrical member to allow said outward extending shoulder to be threaded into and beyond said threads formed on the inside of said nut to locate said outward extending shoulder between said threads and said inward extending shoulder of said nut with said first end of said hollow cylindrical member extending beyond said other end of said nut, said threads and inward extending shoulder of said nut confining said outward extending shoulder of said hollow cylindrical member when located therebetween but allowing said nut and said hollow cylindrical member to move slightly axially with respect to each other, the outside diameter of said outward extending shoulder of said hollow cylindrical member being slightly less than the inside diameter of said nut between its threads and its inward extending shoulder whereby said nut and said hollow cylindrical member are free to rotate relative to each other when said outward extending shoulder of said hollow cylindrical member is located between said threads and said inward extending shoulder of said nut, threads formed on the outside of said first end of said hollow cylindrical member to allow said first end to be threaded into a backshell accessory member when said first end of said hollow cylindrical member extends beyond said other end of said nut, and teeth formed on said other end of said hollow cylindrical member for engaging the teeth of an electrical connector when it is threaded into the threads of said nut.

3. The accessory body of claim 2 comprising:

self-locking means located between the outside wall of said accessory body and the inside wall of said coupling nut when said accessory body is confined by said coupling nut, said self-locking means being located between said inward extending shoulder and said other end of said coupling nut.

4. An electrical connector backshell accessory body adapted to be rotatably confined within a coupling nut of the type having threads formed on its inside at one end and an inward extending shoulder spaced from said threads and located between said threads and the other end of said nut, said accessory body comprising:

a hollow cylindrical member having a first end with an outside diameter sufficient to allow it to freely pass through said coupling nut and an outward extending shoulder located at its other end and having an outside diameter greater than the inside diameter of said inward extending shoulder of said coupling nut, threads formed on the outside of said outward extending shoulder of said hollow cylindrical member to allow said outward extending shoulder to be threaded into and beyond said threads formed on the inside of said nut to locate said outward extending shoulder between said threads and said inward extending shoulder of said nut with said first end of said hollow cylindrical member extending beyond said other end of said nut, said threads and inward extending shoulder of said nut confining said outward extending shoulder of said hollow cylindrical member when located therebetween but allowing said nut and said hollow cylindrical member to move slightly axially with respect to each other, the outside diameter of said outward extending shoulder of said hollow cylindrical member being slightly less than the inside diameter of said nut between its threads and its inward extending shoulder whereby said nut and said hollow cylindrical member are free to rotate relative to each other when said outward extending shoulder of said hollow cylindrical member is located between said threads and said inward extending shoulder of said nut, threads formed on the outside of said first end of said hollow cylindrical member to allow said first end to be threaded into a backshell accessory member when said first end of said hollow cylindrical member extends beyond said other end of said nut, teeth formed on said other end of said hollow cylindrical member for engaging the teeth of an electrical connector when it is threaded into the threads of said nut, and self-locking means located beween the outside wall of said accessory body and the inside wall of said coupling nut when said accessory body is confined by said coupling nut, said self-locking means being located between said inward extending shoulder and said other end of said coupling nut.

5. The combination of an electrical connector back.ell accessory body and a coupling nut, said coupling nut comprising:
  an annular member having threads formed on its inside at one end and an inward extending shoulder located between said threads and the other end of said nut,
  said inward extending shoulder being spaced from said threads and from said other end of said nut, said necessary body comprising:
  a hollow cylindrical member having a first end with an outside diameter sufficient to allow it to freely pass through said coupling nut and an outward extending shoulder located at its other end and having an outside diameter greater than the inside diameter of said inward extending shoulder of said coupling nut, threads formed on the outside of said outward extending shoulder of said hollow cylindrical member to allow said outward extending shoulder to be threaded into and beyond said threads formed on the inside of said nut to locate said outward extending shoulder between said threads and said inward extending shoulder of said nut with said first end of said hollow cylindrical member extending beyond said other end of said nut, said hollow cylindrical member when its first end extends beyond said other end of said nut forming an annular space with the portion of the inside surface of said nut between said inward extending shoulder and said other end of said nut for receiving a self-locking means, said threads and inward extending shoulder of said nut confining said outward extending shoulder of said hollow cylindrical member when located therebetween but allowing said nut and said hollow cylindrical member to move slightly axially with respect to each other, the outside diameter of said outward extending shoulder of said hollow cylindrical member being slightly less than the inside diameter of said nut between its threads and its inward extending shoulder whereby said nut and said hollow cylindrical member are free to rotate relative to each other when said outward extending shoulder of said hollow cylindrical member is located between said threads and said inward extending shoulder of said nut, threads formed on the outside of said first end of said hollow cylindrical member to allow said first end to be threaded into a backshell accessory member when said first end of said hollow cylindrical member extends beyond said other end of said nut, and teeth formed on said other end of said hollow cylindrical member for engaging the teeth of an electrical connector when it is threaded into the threads of said nut.

* * * * *